(12) United States Patent
Schroder et al.

(10) Patent No.: US 8,794,841 B2
(45) Date of Patent: Aug. 5, 2014

(54) TOROIDAL BEARING

(75) Inventors: Rainer Schroder, Egenhausen (DE);
Martin Grehn, Dittelbrunn (DE); Felix Hofbauer, Schweinfurt (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/993,163

(22) PCT Filed: Nov. 18, 2011

(86) PCT No.: PCT/EP2011/070455
§ 371 (c)(1),
(2), (4) Date: Jun. 11, 2013

(87) PCT Pub. No.: WO2012/079911
PCT Pub. Date: Jun. 21, 2012

(65) Prior Publication Data
US 2013/0272639 A1    Oct. 17, 2013

(30) Foreign Application Priority Data
Dec. 17, 2010  (DE) .......................... 10 2010 054 966

(51) Int. Cl.
*F16C 33/66*    (2006.01)

(52) U.S. Cl.
USPC ......................................................... 384/475

(58) Field of Classification Search
USPC .......................................... 384/291, 474, 475
See application file for complete search history.

(56) References Cited

U.S. PATENT DOCUMENTS 4,669,894 A * 6/1987 Hallerback .................... 384/477
5,567,059 A * 10/1996 Weigand et al. ............... 384/560
6,105,724 A   8/2000 Stitz et al.

FOREIGN PATENT DOCUMENTS

EP    0175858    4/1986
JP    11264420 A * 9/1999 .............. F16C 33/66

* cited by examiner

*Primary Examiner* — Phillip A Johnson
(74) *Attorney, Agent, or Firm* — Volpe and Koenig P.C.

(57) ABSTRACT

A toroidal bearing (1) including a multiplicity of barrel-shaped rolling bodies (7) which roll about a bearing axis (8) between an outer ring (2) having a raceway (3) and an inner ring (4) having a raceway (5) is provided. According to the invention, on a circumferential surface (9) facing away from the raceway (3, 5) thereof, the outer ring (2) and/or the inner ring (4) has at least one lubricating groove (10), wherein the lubricating groove (10) is connected to the raceway (3, 5) via at least one lubricating bore (11).

5 Claims, 3 Drawing Sheets

TOROIDAL BEARING

FIELD OF THE INVENTION

The invention relates to a toroidal bearing comprising a plurality of barrel-shaped roller bodies that roll about a bearing axis between an outer ring with a raceway and an inner ring with a raceway.

BACKGROUND

Toroidal bearings are single-row radial roller bearings with barrel-shaped roller bodies that roll on corresponding concave raceways and are guided not by one or two rims, but only by frictional forces. A toroidal bearing is known, e.g., from EP 0 175 858 A1.

Toroidal bearings have a certain radial play of the barrel-shaped roller bodies between the outer ring and the inner ring. This radial play generates a relatively large axial play, so that a toroidal bearing can tolerate an axial displacement between the outer ring and inner ring. A toroidal bearing can thus be used basically in certain applications as loose bearings. Due to the concave raceways and the barrel-shaped roller bodies, a toroidal bearing can also compensate for slightly misaligned positions of the shaft to be supported.

Shaft bearings comprising a self-aligning roller bearing as a fixed bearing point and a self-aligning roller bearing as a loose bearing point (e.g., with radially free outer ring) can be equipped, under some circumstances, with a toroidal bearing as a replacement of the self-aligning roller bearing in the loose bearing point. Here, certain structural adjustments to the surroundings of the loose bearing point are required. Among other things, spacer disks normally must be used, in order to adjust the toroidal bearing in the available installation space. If a relubrication option of the loose bearing point is required, the measures that are typical in single-row radial roller bearings must also be provided: it must be possible to feed lubricant in the axial direction. For this purpose, in part, very complicated structural adjustments of the surrounding construction are necessary. For example, nozzles are typically provided for introducing the lubricant in toroidal bearings or new lubricating channels are formed in the surrounding construction.

SUMMARY

The present invention is based on the objective of providing a toroidal bearing according to the class that creates a simple and effective option for relubrication and thus increases the service life and here can be incorporated, in particular, as a replacement of a self-aligning roller bearing in existing surrounding constructions and is to be produced easily and economically, in particular, requires no surrounding construction to be adapted specifically to the toroidal bearing.

This objective is met by a toroidal bearing ring according to the independent claim. Consequently, a toroidal bearing according to the class is characterized in that the outer ring and/or the inner ring has at least one lubricating groove on a lateral surface facing away from its raceway, wherein the lubricating groove is connected to the raceway by means of at least one lubricating bore.

The bearing ring with the lubricating groove can hold lubricant in the lubricating groove via the side opposite the raceway in the radial direction and can feed the lubricant directly into the roller body space via the lubricating bore. Compared with the conventional axial feeding of lubricant in toroidal bearings, the lubricant can be fed directly at the contact between the roller body and raceway. The lubricating relationships are therefore clearly better.

Double-row radial self-aligning roller bearings are typically provided with lubricant via a lubricating groove arranged centrally in the axial direction in the outer ring. The toroidal bearing according to the invention is thus suitable for use in existing surrounding constructions of such self-aligning roller bearings and the measures already provided for feeding lubricant. It is thus possible to keep the existing lubricant feeding within the surrounding construction.

The bearing ring with the lubricating groove involves the fixed bearing ring. Typically, this is formed by the outer ring. The lateral surface on which the lubricating groove is arranged can have a cylindrical or conical design.

Embodiments of the present invention are specified in the dependent claims.

The number of lubricating grooves, their shape (e.g., axial extent and shape of the groove cross section), and the positioning of the lubricating groove on the lateral surface can be adapted to the existing surrounding construction. It is conceivable, in particular, to provide exactly one lubricating groove positioned centrally in the axial direction with respect to the bearing axis.

In order to avoid overrunning of the lubricating bore(s) under load, it is provided according to one embodiment that the at least one lubricating groove has several lubricating bores, wherein all of the lubricating bores are arranged in a circumferential section of the lubricating groove with an opening angle of 45 to 180 degrees, advantageously 90 to 130 degrees. The bearing ring can now be positioned so that the lubricating bores are arranged opposite the load zone in the radial direction.

It is basically possible that the at least one lubricating groove completely surrounds a lubricating groove on the lateral surface. To prevent a weakening of the bearing ring with the lubricating groove in the region of the load zone, it can also be provided, however, that the at least one lubricating groove extends circumferentially only over a section with an opening angle of 45 to 180 degrees, advantageously 90 to 130 degrees, of the lateral surface. In the installation of the toroidal bearing according to the invention, this section is positioned radially opposite the load zone to be expected during operation. A lubricating groove extending circumferentially only over a section can be formed in the bearing ring especially such that a center point of a curve in the at least one lubricating groove is positioned radially offset to the bearing axis in a sectional view perpendicular to the bearing axis. The lubricating groove thus has a radial offset to the lateral surface.

If the lubricating groove extends circumferentially over only a section of the lateral surface or if the lubricating bores extend circumferentially over only a section of the lubricating groove, then the corresponding bearing ring can have an anti-rotation mechanism. Thus it can be ensured that the bearing ring with the lubricating groove/lubricating bores is always positioned correctly during operation with respect to the expected formation of the load zone. It is also possible to provide this bearing ring with optical and/or haptic detection features on an end face, in order to ensure the correct alignment of this bearing ring during assembly.

BRIEF DESCRIPTION OF THE DRAWINGS

Embodiments of the present invention are explained below with reference to the accompanying figures. Shown here are FIG. 1 a toroidal bearing according to a first embodiment, FIG. 2 the outer ring of the toroidal bearing according to the first embodiment, FIG. 3 an outer ring of a toroidal bearing according to a second embodiment, FIG. 4 an outer ring of a toroidal bearing according to a third embodiment, and FIG. 5 a top view of the outer ring from FIG. 4.

DETAILED DESCRIPTION OF THE PREFERRED EMBODIMENTS

Elements that are identical or functionally identical are marked with the same reference symbols.

Figure 1:
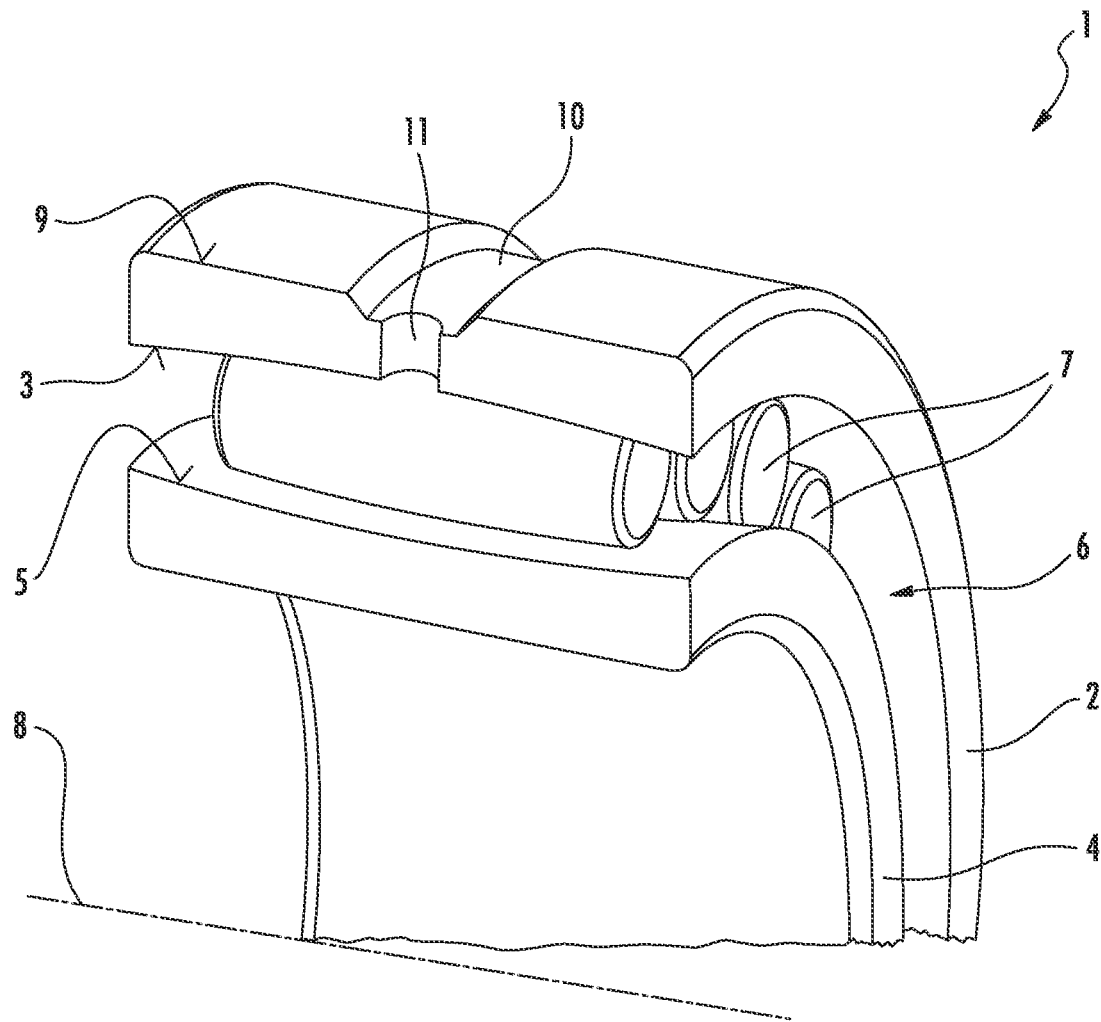

FIG. 1 shows a toroidal bearing 1 according to the invention and according to a first embodiment. The toroidal bearing 1 comprises an outer ring 2 with an outer ring raceway 3 and an inner ring 4 with an inner ring raceway 5. The two raceways 3, 5 face each other and form an annular gap, namely the roller body space 6, in which the barrel-shaped roller bodies 7 roll on the raceways 3, 5 about a bearing axis 8.

The roller bodies 7 are not held in a cage in the first embodiment—but obviously a cage would also be conceivable for guiding the roller bodies 7.

The outer ring 2 has a lubricating groove 10 on a lateral surface 9 facing away from the raceway 3, i.e., opposite in the radial direction. With respect to the bearing axis 8, the lubricating groove 10 is arranged centrally in the axial direction on the lateral surface 9.

The lubricating groove 10 has a trapezoidal cross-sectional profile and extends circumferentially over the entire outer ring 2.

The lubricating groove 10 is connected via a lubricating bore 11 to the raceway 3 or the roller body space 6. Lubricant introduced into the lubricating groove 10 from the outside, i.e., from a not-shown surrounding construction, can thus be brought via the lubricating bore 11 to the contact between the roller body 7 and raceway 3.

The lubricating bore 11 running only in the radial direction is arranged centrally in the axial direction in the lubricating groove 10.

The outer ring 2 has only a single lubricating bore 11. Thus it is possible to use the outer ring 2 in a surrounding construction such that the single lubricating bore is radially opposite the expected load zone. An adverse effect on the load rating of the toroidal bearing or adverse deformations of the outer ring in the area of the lubricating bore are thus reduced to a minimum.

Figure 2:
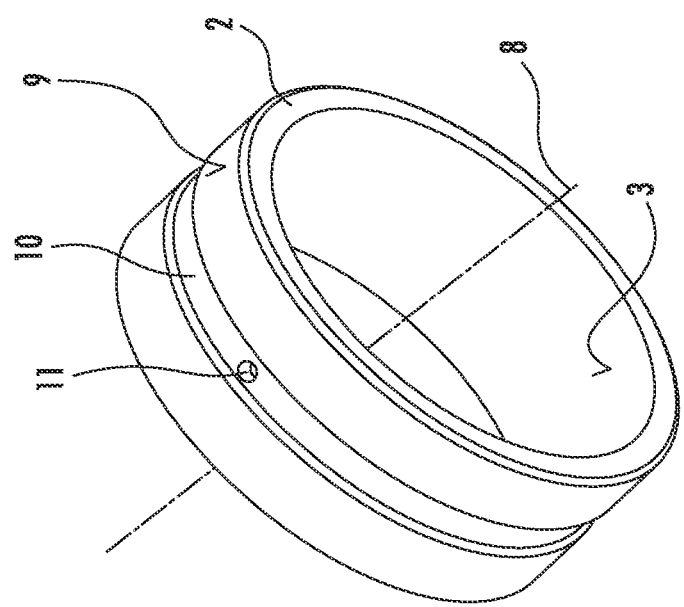

In FIG. 2, the outer ring of the toroidal bearing 1 according to the first embodiment from FIG. 1 is shown in a perspective view.

Figure 3:
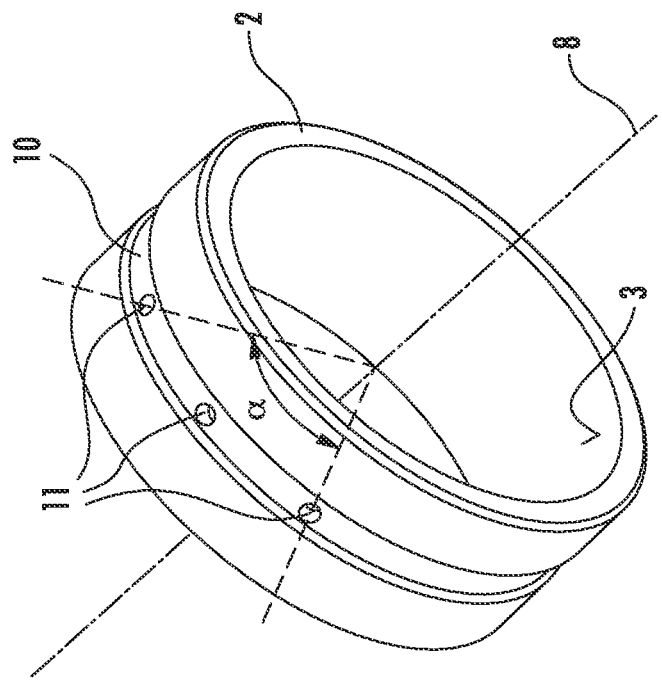

In FIG. 3, an outer ring 2 of a toroidal bearing according to the invention and according to a second embodiment is shown. This outer ring 2 can here be combined with the inner ring 4 and the roller bodies 7 from FIG. 1 to a toroidal bearing according to the invention.

The outer ring 2 has, in turn, a single lubricating groove 10 completely surrounding the outer ring. The lubricating groove 10, however, is connected by means of three lubricating bores 11 spaced apart from each other in the circumferential direction to the raceway 3 or the roller body space.

While the feeding of lubricant is therefore improved, the circumferential arrangement of the lubricating bores in a relatively small section ensures that the outer ring 2 is not subjected, in turn, to any weakening due to lubricating bores in an expected load zone. Thus, the three lubricating grooves extend circumferentially only over a section with an opening angle of α=45 degrees.

Figure 4:
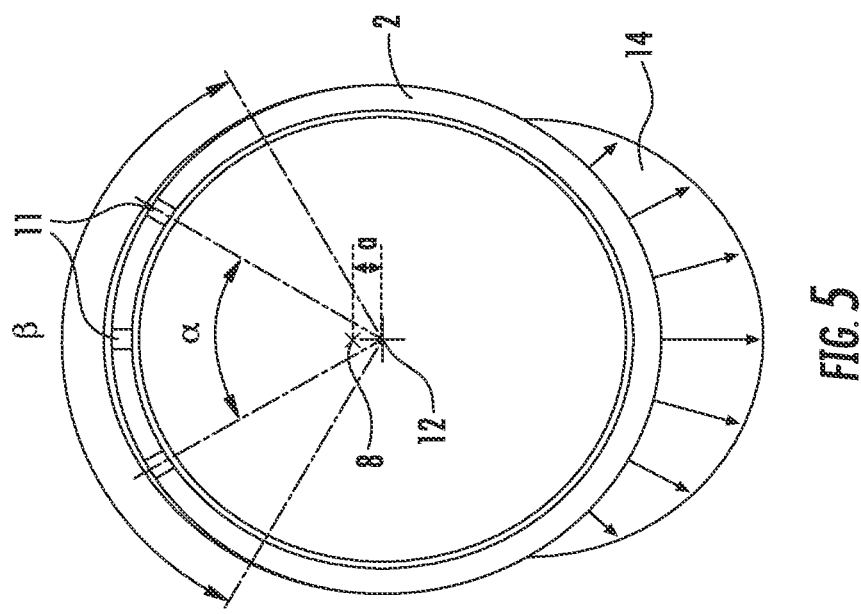
Figure 5:
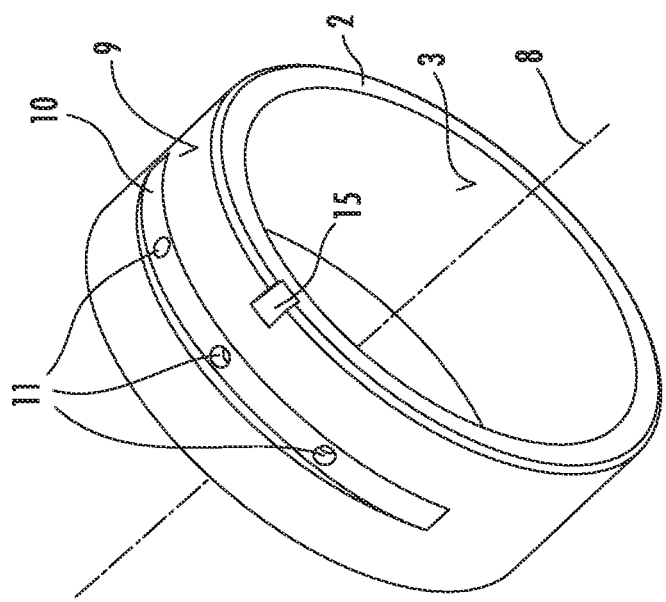

In FIGS. 4 and 5, an outer ring of a toroidal bearing according to a third embodiment is shown. The lubricating groove 10 is connected to the raceway 3, in turn, by means of three circumferentially distributed lubricating bores 11. The opening angle of the section of the lateral surface with the lubricating bores 11 equals, in this example, α=60 degrees.

The lubricating groove 10 does not enclose the entire outer ring 2. Instead, the lubricating groove 10 extends circumferentially over only a section of the lateral surface 9. This section has an opening angle of β=125 degrees.

The lubricating groove 10 does indeed have a constant curvature circumferentially, but its center 12 of the curve is offset radially, that is, eccentrically, relative to the bearing axis 8 by the magnitude 'a'.

Both the lubricating groove 10 and also lubricating bores 11 can thus be positioned radially opposite with respect to a schematically shown load zone 14.

The outer ring 2 also has an anti-rotation mechanism 15, in the form of a notch, in order to avoid a rotation of the outer ring during operation. This anti-rotation mechanism 15 allows a correct installation of the outer ring 2.

List of Reference Numbers
1 Toroidal bearing
2 Outer ring
3 Outer ring raceway
4 Inner ring
5 Inner ring raceway
6 Roller body space
7 Roller body
8 Bearing axis
9 Lateral surface
10 Lubricating groove
11 Lubricating bore
12 Center of the curve
14 Load zone
15 Anti-rotation mechanism
α Opening angle
β Opening angle

The invention claimed is:

1. A toroidal bearing, comprising a plurality of barrel-shaped roller bodies that roll about a bearing axis between an outer ring with a raceway and an inner ring with a raceway, at least one of the outer ring or the inner ring has at least one lubricating groove on a lateral surface facing away from the raceway thereof, and the at least one lubricating groove is connected to the raceway by at least one lubricating bore and extends circumferentially over only a section with an opening angle (β) of 45 to 180 degrees of the lateral surface.

2. The toroidal bearing according to claim 1, wherein the at least one lubricating groove is provided positioned centrally in an axial direction with respect to the bearing axis.

3. The toroidal bearing according to claim 1, wherein the at least one lubricating groove has a plurality of lubricating bores, and the plurality of lubricating bores lie in a circumferential section of the at least one lubricating groove with the opening angle (α) of 45 to 180 degrees.

4. The toroidal bearing according to claim 1, wherein the at least one lubricating groove forms a complete circle on the lateral surface.

5. The toroidal bearing according to claim 1, wherein in a section view perpendicular to the bearing axis, a center of a curve of the at least one lubricating groove is positioned radially offset relative to the bearing axis.

\* \* \* \* \*